Oct. 13, 1964 H. G. KLEMM ETAL 3,152,702
GRAIN TANK AND CONVEYOR ASSEMBLY FOR COMBINES
Filed April 4, 1962 5 Sheets-Sheet 1

INVENTORS.
HERMAN G. KLEMM,
DONALD S. HORNE,
ROBERT ASHTON, &
LESLIE L. KEPKAY
BY
*Wolfe, Hubbard, Voit & Osann*
ATTORNEYS.

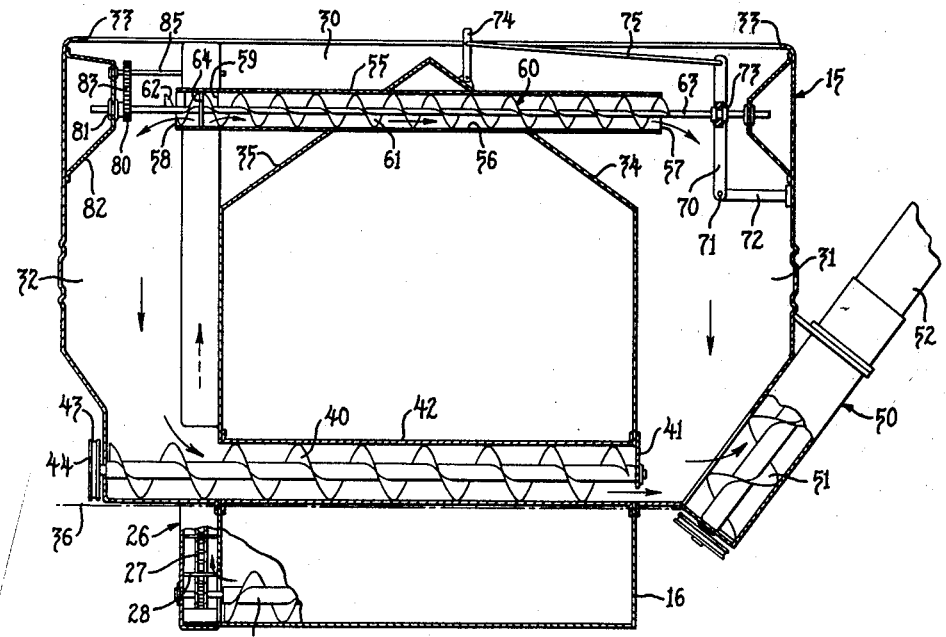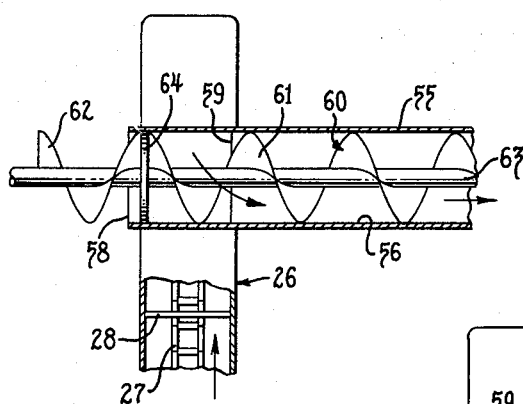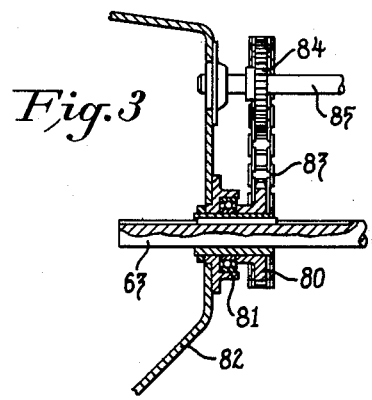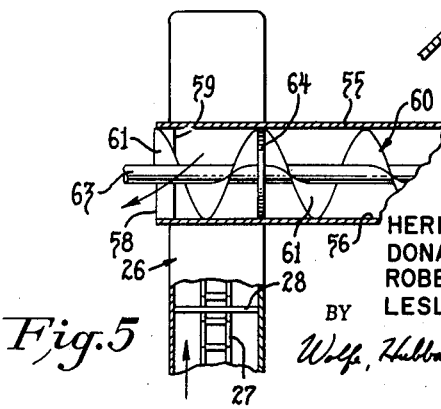

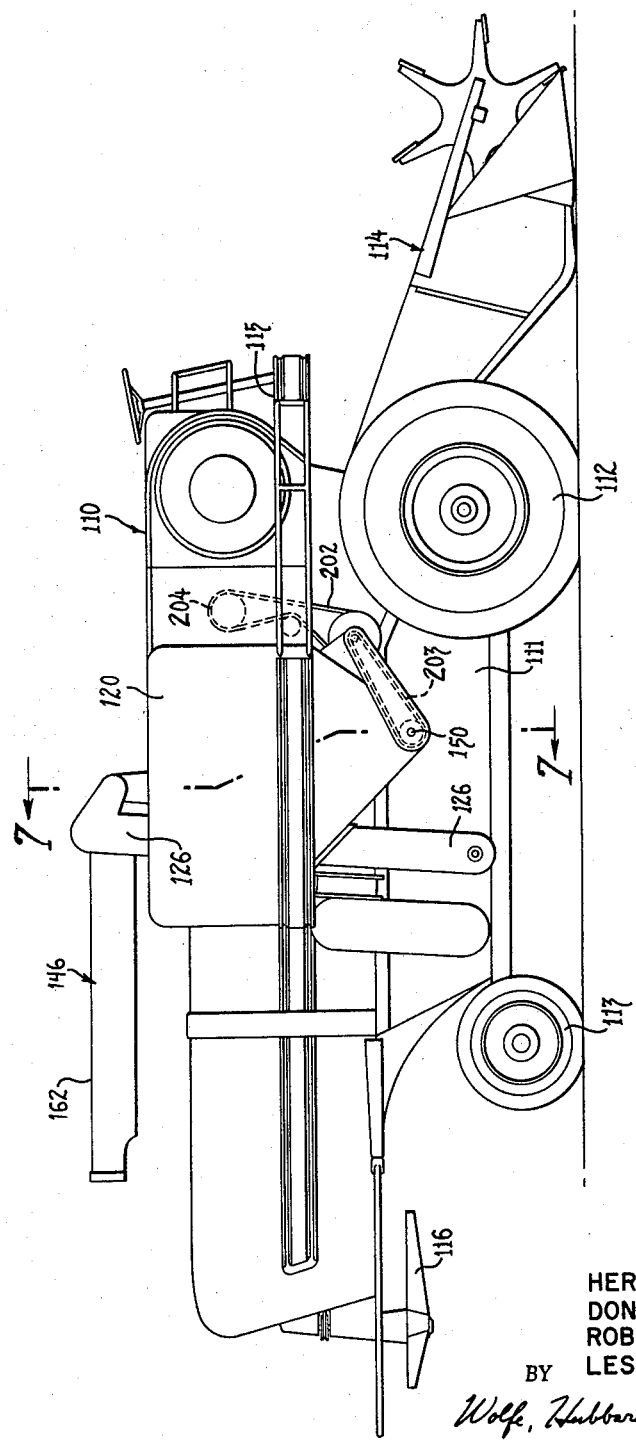

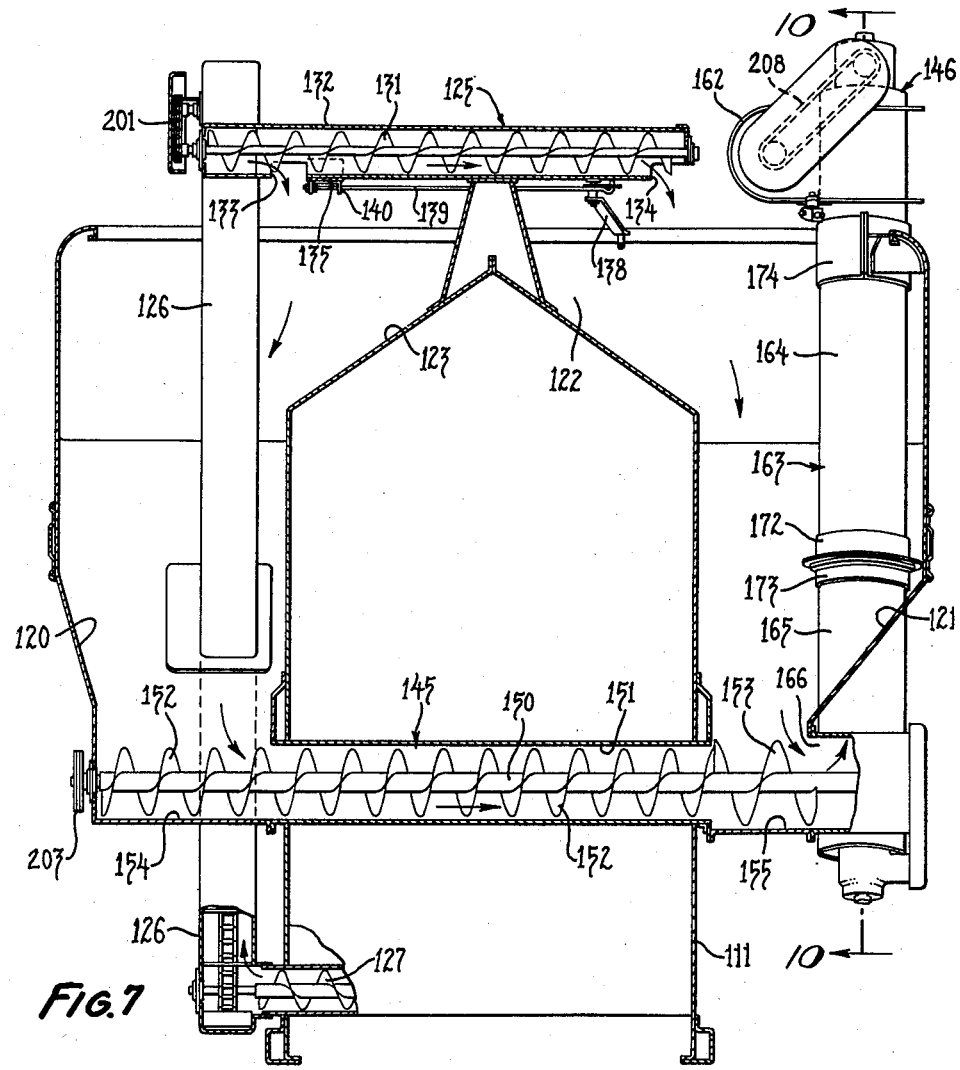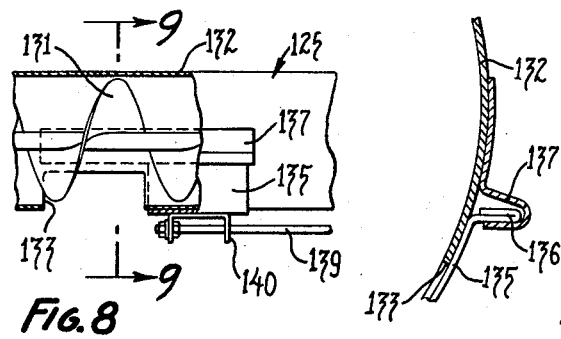

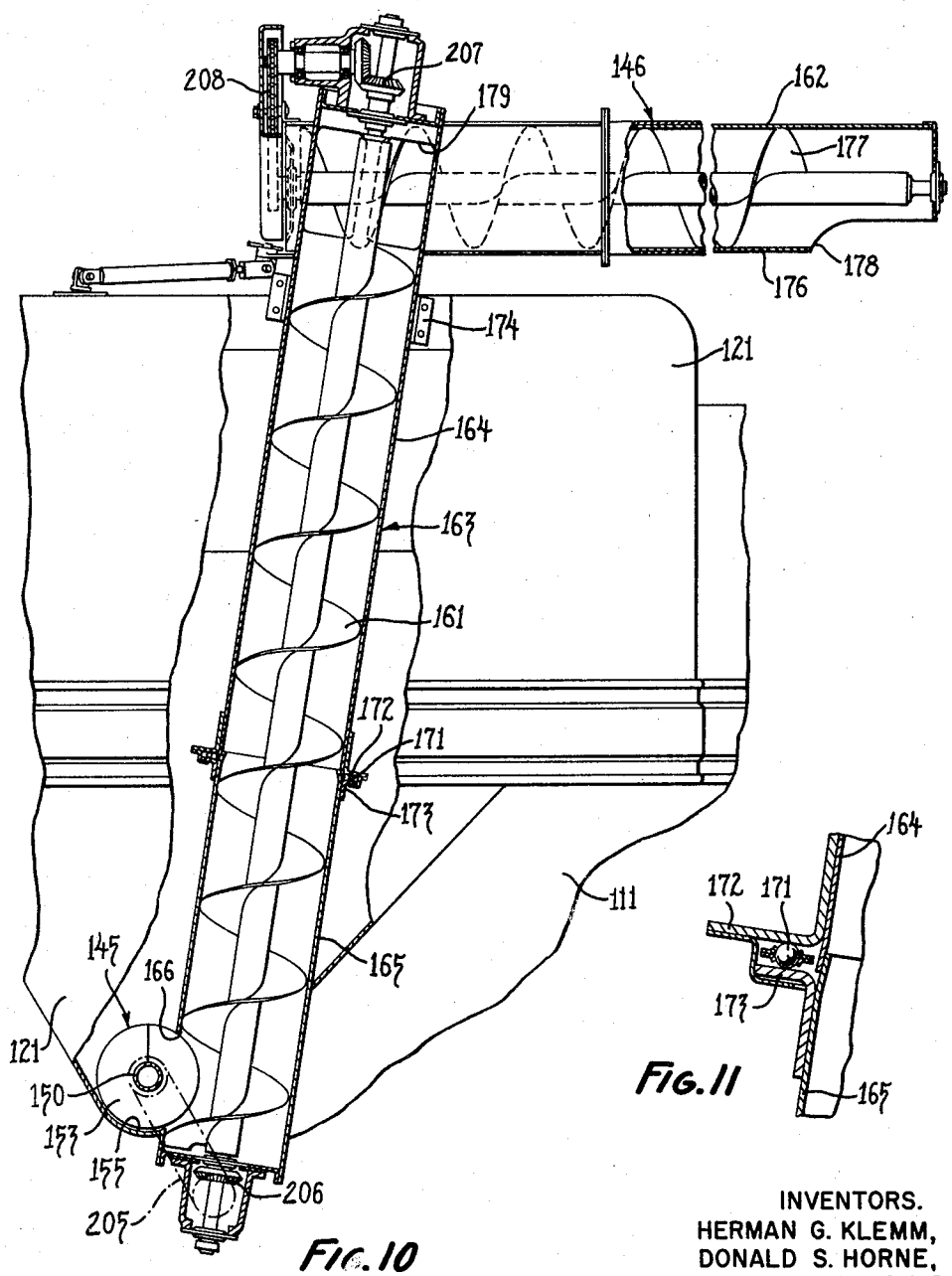

United States Patent Office 3,152,702
Patented Oct. 13, 1964

3,152,702
GRAIN TANK AND CONVEYOR ASSEMBLY
FOR COMBINES
Herman G. Klemm, Largo, Fla., and Donald S. Horne, Robert Ashton, and Leslie L. Kepkay, Toronto, Ontario, Canada, assignors to Massey-Ferguson Limited, Toronto, Ontario, Canada
Filed Apr. 4, 1962, Ser. No. 184,990
16 Claims. (Cl. 214—17)

The present invention relates generally to crop harvesting machines such as self-propelled combines, and more particularly to grain tank and conveyor mechanisms for temporarily storing and handling harvested grain in such machines.

This application is a continuation-in-part of our earlier filed applications, Serial Nos. 738,718, filed May 29, 1958, now abandoned and 21,163, filed April 11, 1960, now Patent No. 3,108,703.

A primary aim of the present invention is to provide a novel grain tank and conveyor assembly for a combine permitting a substantial reduction in the over-all height of the machine and improved distribution of weight thereon without sacrificing grain storage capacity.

More particularly, it is an object of the invention to provide a grain tank and conveyor assembly of the character just set forth and including a grain tank structure straddling the combine so as to define a pair of side or "saddle" tanks and a novel arrangement for loading and unloading the side tanks.

Another object is to provide a saddle tank structure for a combine as characterized above and having a novel loading system which permits selective proportional distribution of the harvested grain between the side or saddle tanks.

A further object is to provide a combine grain tank structure with a novel unloading system capable of discharging grain from two spaced grain tanks simultaneously so that the combine tends to remain in balance during unloading. A related object is to provide an unloading system of this nature which will operate without forcing grain through one of the anks in such a manner as to cause packing and grain damage.

Another object is to provide a combine grain tank and handling assembly of the character set forth herein which is positive and reliable in operation and susceptible of economical manufacture.

Other objects and advantages of the invention will become apparent upon reading the following detailed description and upon reference to the accompanying drawings, in which:

FIG. 2 is a slightly enlarged transverse sectional view taken in the plane of line 2—2 of FIG. 1 with certain portions broken away.

FIG. 3 is an enlarged fragmentary sectional view of the upper, left-hand portion of FIG. 2.

FIGS. 4 and 5 are enlarged fragmentary sectional views of the open end of the elevator as shown in FIG. 2 with the parts in two alternate operating positions.

FIG. 6 is an elevation of another illustrative combine also embodying the present invention.

FIG. 7 is an enlarged transverse sectional view taken approximately in the plane of the line 7—7 of FIG. 6.

FIG. 8 is a further enlarged fragmentary sectional view of a portion of the structure appearing in FIG. 7.

FIG. 9 is a fragmentary sectional view taken in the plane of the line 9—9 of FIG. 8.

FIG. 10 is a fragmentary sectional view taken in the plane of the line 10—10 of FIG. 7.

FIG. 11 is an enlarged fragmentary sectional view of a portion of the structure shown in FIG. 10.

Figure 1:
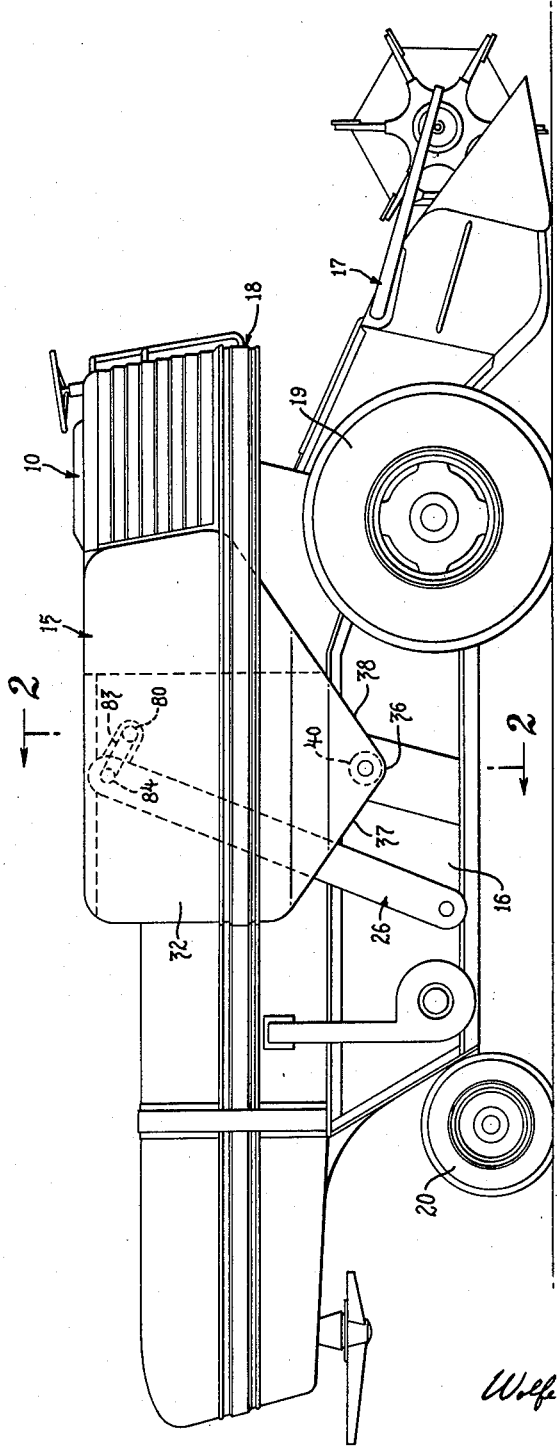
FIGURE 1 is a side elevation of one illustrative combine including a grain tank construction embodying the present invention.

While the invention is susceptible of various modifications and alternative constructions, certain illustrative embodiments have been shown in the drawings and will be described below in considerable detail. It should be understood, however, that there is not intention to limit the invention to the specific forms disclosed, but, on the contrary, the intention is to cover all modifications, alternative constructions and equivalents falling within the spirit and scope of the invention as expressed in the appended claims.

Referring more specifically to the drawings, there is shown in FIGURE 1 an illustrative self-propelled combine 10 including a grain tank structure 15 embodying the present invention. The combine 10 also includes a main body frame 16 enclosing crop processing mechanisms and carrying at its forward end a header assembly 17 and an operator's platform 18. The combine rides on front traction wheels 19 and rear steering wheels 20.

A conventional grain collection mechanism is mounted in the combine 10 including a transverse auger 25 (see FIG. 2) which runs beneath the cleaning shoe assemblies (not shown) mounted in the body frame 16. The auger 25 collects the grain separated from the harvested material and delivers it to an elevator structure 26 lying along one side of the body frame 16. The elevator structure 26 includes a driven chain 27 carrying a series of pusher plates 28 which are effective to lift the grain to an upper portion of the tank structure 15 in a manner well known to those familiar with the art.

In carrying out the present invention, the grain tank on the combine 10 includes a center tank portion 30 overlying the body frame 16 and a pair of side tanks 31, 32 communicating with the center portion and disposed on opposite sides of the frame. The arrangement thus forms a saddle-like tank structure with the frame 16 serving as a separating means for the side or "saddle" tanks 31, 32. The center portion 30 has a rim 33 surrounding an open top so that the combine operator on the platform 18 can readily determine the size of the load contained in the tank structure 15. The entire tank structure extends to a height substantially equal to the height of the frame 16, giving the combine 10 an exceptionally low silhouette.

In order to facilitate the discharge of grain from the tank structure 15, the center portion 30 is provided with oppositely inclined bottom walls 34, 35, which slope downwardly into the side tanks 31, 32, respectively. This gives the top of the combine body frame 16 a "gabled roof" appearance, as may be seen in FIG. 2. In addition, each of the side tanks 31, 32 is formed having bottom walls sloping downwardly toward a line 36 extending transversely through the frame 16. To this end the side tank 32 is provided with sloping bottom walls 37, 38 (see FIG. 1) and it will be understood that the side tank 31 has a similar bottom configuration.

As a feature of the invention, provision is made for simultaneously unloading the side tanks 31, 32 by a conveyor disposed through the separating means, in this case the frame 16, and along the transverse line 36 (FIGS. 1 and 2). In the present embodiment, the unloading conveyor takes the form of an auger 40 journaled at one end in the side wall of the tank 32 and at the other end to a bracket 41 attached to the frame 16. The auger 40 extends through a tubular passage 42 in the combine and is powered by a belt 43 which engages a pulley 44 secured to one end of the auger. It will be appreciated that rotation of the auger 40 will carry grain from the side tank 32 and deposit it at the bottom of the side tank 31.

To discharge grain from the combine 10, a discharge conveyor 50 is mounted at the side of the tank 31. The conveyor 50 includes an auger 51 and a positionable spout 52. In order to unload the grain tank structure 15, the augers 40 and 51 are each rotated so that grain in each of the side tanks 31, 32 is simultaneously discharged through the spout 52.

It can be seen that the sloping bottom walls 34, 35 of the center portion of the grain tank structure and the sloping botom configuration of the two side tanks 31, 32 insure positive feed of the grain contained in the tank structure toward the discharge augers 40 and 51. As has been stated, operation of these augers results in the simultaneous unloading of each of the side tanks 31, 32.

Further in accordance with the invention, a mechanism is provided for selectively distributing the material lifted by the elevator 26 into the tank structure 15 so that any proportion of the total amount of material fed can be directed into either side tank. In the present instance, this mechanism includes a tube 55 which defines a conveying channel 56 having opposite discharge ends 57, 58 defining separate delivery points and communicating with the side tanks 31, 32, respectively. The elevator 26 communicates with the tube 55 through an opening 59 so that the harvested material carried upwardly by the elevator 26 is deposited into the tube.

For moving the harvested material along the conveying channel 56, an auger 60 is journaled so as to extend through the tube 55. In this instance, the auger 60 is provided with flights 61, 62 of opposite hand which are carried on the auger shaft 63. The oppositely wound flights 61, 62 are separated by a plate 64, carried by the auger shaft 63, that is disposed adjacent the opening 59 and is effective to block the conveyor channel 56.

It can therefore be seen that the grain fed upwardly by the conveyor 26 and discharged through the opening 59 will be directed by the plate 64 toward one or the other of the auger flights 61, 62. Rotation of the auger 60 thus moves the grain directed to the auger flight 61 toward the discharge end 57 of the tube 55, whereas grain directed to the auger flight 62 is moved to the discharge end 58 of the tube.

In order to selectively proportion the amount of harvested material fed from the opposed conveyor discharge ends 57, 58, the auger 60 is shiftable axially so that the plate 64 may be adjustably positioned from one side of opening 59 to the other. To shift the auger 60 axially, a lever 70 is pivoted at 71 to a bracket 72 mounted on the inner wall of the side tank 31. The lever 70 engages a collar 73 secured to the auger shaft 63. To conveniently swing the lever 70, a control lever 74 is connected by a link 75 to the lever 70. It will be understood that by positioning the control lever 74, the operator is able to shift the auger 60 axially and thus position the plate 64 at any desired point across the opening 59.

In order to drive the auger 60 while permitting it to shift axially, a sprocket 80 is splined to one end of the auger shaft 63 and is journaled in a bearing 81 carried by a bracket 82 fixed to the side wall of tank structure 15. The sprocket 80 thus is restrained from axial movement and rotatably supports the end of the auger shaft 63. Driving the sprocket 80 is a chain 83 trained about the sprocket 80 and a second sprocket 84 that is secured to a shaft 85 which is coupled to the chain 27 of the elevator 26. In this way, rotation of the elevator chain 27 is accompanied by rotation of the auger 60.

It will now be appreciated that the operator of the combine 10 has complete control of the distribution of the harvested material between the side tanks 31, 32. By manipulating the control lever 74 so that the plate 64 is approximately at the center of the opening 59 (see FIG. 2), an approximately equal amount of grain will be directed by the plate 64 to each of the auger flights 61, 62 and thus equal amounts of grain will be supplied to each of the side tanks. When the lever 74 is swung so as to carry the plate 64 to the FIG. 4 position, all of the grain discharged by the conveyor 26 through the opening 59 is directed to the auger flight 61 and thus is fed into the side tank 31. When the lever 74 is swung in the opposite direction to position the plate 64 in its FIG. 5 position, all of the material from the conveyor 26 will be urged by the auger flight 62 into the side tank 32.

Because of the saddle tank construction described above, the combine 10 can be quite low in height without sacrificing grain tank capacity. It will also be appreciated that by carrying the heavy grain loads in side tanks, the weight of the grain is balanced on either side of the combine and is not effective to overbalance the combine or tend to make it top heavy.

Since the combine operator has control of the grain distribution between the two side tanks, the grain can be distributed so that the combine remains evenly balanced. In addition, however, this feature provides the added advantage of permitting deliberate loading of the combine on one side or the other. Thus, when the combine is operated on a hillside, the weight of the grain can be used to counter-balance the weight of the inclined machine and thereby produce much more stable operation. The mechanism for permitting selective distribution of the grain between the side tanks is quite simple and can therefore be economically manufactured.

Turning now to FIGURES 6 to 11, inclusive, another illustrative combine 110 also embodying the invention is there exemplified. As shown more particularly in FIG. 6, the combine 110 includes a main body porton 111 supported by front driving wheels 112 and rear steering wheels 113. A grain header assembly 114 is supported at the forward end of the machine with an operator's platform 115 disposed above and rearwardly of the assembly 114 so as to overlook the latter. The combine body 111 encloses crop processing devices such as grain threshing and separating mechanisms, and a straw scatterer 116 is journalled at the rear of the machine.

In order to receive and temporarily store the harvested grain, the combine 110 is provided with a side or "saddle" tank construction of the type described earlier herein. In this instance, such construction includes a pair of side or saddle tanks 120 and 121 separated by the combine body 111 and extending down along the opposite sides thereof. The side tanks 120, 121 are interconnected by a center tank portion 122 lying above an upwardly sloping, or gabled, top 123 of the combine body (FIG. 6).

Pursuant to the invention, grain is fed to the tanks 120, 121 and the tank portion 122 by a novel distributing conveyor 125 which selectively distributed the grain between separate delivery points above the respective side or saddle tanks so that the relative loading of each tank can be varied or kept equal. The harvested grain is received by the conveyor 125 from a loading elevator 126 that lifts grain from a cross auger 127, the latter gathering the grain from the separating mechanisms of the combine.

In the present instance, the distributing conveyor 125 includes an auger 131 journaled in a channel defined by a tube 132 having discharge openings 133 and 134 one above each side tank 120, 121, and provision is made to vary the size of the opening 133 that is nearest the loading elevator 126. The size of the opening 133 may, for example, be varied quite simply and economically through the use of a sliding, arcuate cover 135 having flanged edges 136 which are received in slides 137 secured to the opposite sides of the tube 132 (see FIGS. 3 and 4). The cover 135 can be slid axially of the auger 131 so as to completely close, or completely open, the discharge opening 133.

In order to adjust the position of the cover 135, a bell crank 138 is pivoted to the underside of the tube 132 (see FIG. 7) and a control rod 139 is extended between one arm of the bell crank and a bracket 140 secured to the cover 135. The other arm of the bell crank 138 extends forwardly of the combine so that the operator, sitting on the platform 115, can reach behind him and rotate the bell crank to position the cover 135 as desired.

It will, of course, be understood that if the opening 133 is completely closed by the cover 135, then all of the grain moved by the auger 131 will be deposited through the opening 134 into the side tank 121. However, as the opening 133 is uncovered by sliding the cover 135 toward the right (as view in FIG. 7), more and more grain will be dropped through the opening 133 into the side tank 120 and therefore less of the total amount of grain being carried by the distributing conveyor 125 will be moved over to the tank 121. Thus, by positioning the cover 135, the relative amounts of grain deposited in each of the side tanks can be accurately controlled.

By loading the side tanks 120 and 121 evenly, that is, by depositing equal amounts of grain in each of the two tanks, the combine can be kept in lateral balance as the amount of grain temporarily stored in the tanks increases. Alternatively, one or the other of the side tanks 120, 121 can be deliberately loaded to a greater extent than the other tank so that the combine is placed in lateral unbalance. This is often desirable to provide stability for the combine when it is working on sharply sloping ground. Through the lever 138, the operator of the machine is in complete control of the relative loading of the side tanks.

In order to unload the grain receiving and storing tanks of the combine 110, a transfer conveyor 145 is provided which feeds grain from the side tanks to a discharge conveyor 146 that deposits the grain wherever desired, for example, in the box of the truck moving alongside the combine. In carrying out the invention, the transfer conveyor feeds grain concurrently from each side tank 120, 121 without forcing or packing the grain into one of the tanks.

To accomplish this, the conveyor includes an auger shaft 150 journaled with a tubular passage 151 interconnecting the bottoms of the tanks 120, 121. A first auger flight 152 is wound on the shaft 150 so as to extend across the bottom of the tank 120, through the passage 151, and to the bottom of the tank 121. A second auger flight 153 of greater capacity than the flight 152 is wound on the shaft 150 so as to extend from the passage 151, through the bottom of the tank 121, and to the discharge conveyor 146. The term "capacity" as used in describing the auger flights 152 and 153, and as used hereafter in this specification and the attached claims, refers to the amount of grain fed by a conveyor during a given time interval as, for example, bushels per second. In the illustrated embodiment, the flight 153 is of a greater diameter than the flight 152 so as to have a greater capacity for moving grain with each revolution of the auger shaft 150. To facilitate the action of the auger flights 152, 153 on the grain, the tank 120 is provided with an arcuate bottom 154 forming a channel for the flight 152, and the tank 121 is provided with an arcuate bottom 155 forming a channel for the auger flight 153.

In operation, it will be appreciated that the auger flight 153 will move more grain than the auger flight 152 and hence the flight 153 will be effective to unload the tank 121 as well as carry forward the grain brought through the passage 151 by the flight 152 from the tank 120. In other words, the varying capacities of the auger flights 152, 153 result in concurrent unloading of each of the side tanks 120 and 121 upon rotation of the auger shaft 150. Since each tank is unloaded at the same time, the lateral balance of the combine is not seriously affected during this operation. Because of the greater capacity of the auger flight 153, the flight 152 cannot pack the grain into the bottom of the tank 121 so as to damage the grain or wedge it in so tightly that the grain tends to "bridge" above the transfer conveyor and thus hinder unloading of the tank 121.

The discharge conveyor 146 includes a generally vertical elevating auger 161 (see FIG. 10), for raising the grain to the top of the combine, and a generally horizontal conveyor 162 rotatably mounted at the top of the auger 161 so as to be positionable laterally from the side of the combine. In order to rotatably mount the horizontal conveyor 162, the elevating auger 161 is journaled in a tubular housing 163 having upper and lower portions 164 and 165, respectively, with the lower portion having an opening 166 to receive grain from the transfer conveyor 145 and the upper portion being mounted on the lower portion for rotation about their common axis. The horizontal conveyor 162 is carried by the upper portion 164 of the housing 163, and hence the conveyor 162 rotates with the rotatably mounted upper portion.

In the presently illustrated embodiment, the rotatable mounting of the upper portion 164 on the lower portion 165 includes a thrust bearing 171 interposed between flanges 172 and 173 secured to the upper and lower portions 164, 165, respectively (see FIG. 11). In addition, a circular strap 174 is secured to the upper edge of the tank 121 and loosely surrounds the upper portion 164 of the tubular housing. It can thus be seen that the thrust bearing 171 carries the weight of the upper portion 164 and the horizontal conveyor 162 and allows the upper portion to turn smoothly within the strap 174.

The horizontal conveyor 162 includes a member 176 defining a channel within which is journaled an auger 177. A discharge opening 178 is formed in the outer end of the member 176, and an opening 179 is provided between the upper portion 164 of the tubular housing 163 and the member 176 so that the grain may be passed from the elevating auger 161 to the horizontal conveyor auger 177.

In order to obtain positive and reliable operation of the grain unloading system at a high rate of feed, the capacity of the elevating auger 161 is made greater than the capacity of the auger flight 153, and the capacity of the horizontal conveyor auger 177 is greater than the capacity of the auger 161. Thus, each time the grain is passed from one conveyor means to another during unloading, the grain feed rate potential is increased and, as a result, there is no packing or jamming at the transfer points even through the whole system is operated at a high rate of feed.

As observed above, "capacity" in this description means the bushels per second potential of a grain conveyor, and it will be appreciated that the capacity of an auger conveyor can be increased by increasing the rotational speed of the auger, or increasing the size of the auger, or increasing the pitch of the auger flights. In the illustrated embodiment, the auger 161 is of greater diameter than the flight 153 so as to obtain the desired capacity jump, and the auger 177 is driven at greater speed than the auger 161 so as to obtain the desired capacity jump. Alternatively, of course, the other variables could be altered to change capacities without departing from the invention.

In order to power the distributing conveyor 125, a chain and sprocket connection 201 is provided coupling the upper end of the loading elevator 126 with the auger 131 (see FIG. 7). For driving the transfer and discharge augers, belts 202 and 203 are provided rotatably coupling the auger shaft 150 with a pulley 204 on the main drive shaft of the combine (see FIGS. 6 and 7). The auger shaft 150 is coupled by a chain 205 and bevel gears 206 (see FIG. 10) to the auger 161, and bevel gears 207 and chain 208 couple the augers 161 and 177. It can thus be seen that power supplied to the transfer conveyor 145 also drives the discharge conveyor 146. It will also be observed that the horizontal conveyor 162, together with the upper portion 164 of the housing 163, can be freely swung on the thrust bearing 171 without interfering with the drive for the horizontal conveyor.

We claim as our invention:

1. In an agricultural harvester having a body frame, a tank structure for receiving harvested material, comprising, in combination, a center tank portion overlying the harvester frame, a pair of side tanks communicating with said center tank portion and being disposed on opposite sides of said frame, said center tank portion having oppositely sloping bottom walls inclined into the respective side tanks, said side tanks having bottom walls sloping downwardly to a line extending transversely through said frame, and an unloading conveyor disposed along said line and communicating with each of said side tanks so as to permit unloading of harvested material from the tank structure.

2. In an agricultural harvesting machine, the combination comprising, a body frame, a saddle tank structure for receiving harvested material, said structure including a center tank portion overlying the harvester frame and a pair of side tanks communicating with said center portion and being disposed on opposite sides of said frame, said center tank portion having oppositely sloping bottom walls inclined into the respective side tanks, said side tanks having bottom walls sloping downwardly to a line extending transversely through said frame, an unloading conveyor mounted adjacent one of said side tanks and in communication with the bottom of the tank, and an unloading auger disposed along said line and through said frame, said auger communicating with each of said side tanks so as to carry material to the side tank having the conveyor from the other side tank.

3. In an agricultural harvesting machine, the combination comprising, a body frame, a saddle tank structure for receiving harvested material, said structure including a pair of side tanks disposed on opposite sides of said frame, means on said frame for collecting the material harvested by the machine including an elevator for lifting the material to the upper portion of said tank structure, and means on said frame for selectively distributing the material lifted by said elevator into said side tanks so that any proportion of the total amount of material fed can be directed into either tank.

4. In an agricultural harvesting machine, the combination comprising, a body frame, a saddle tank structure for receiving harvested material and including a pair of side tanks disposed on opposite sides of said frame, said side tanks extending to a height substantially equal to the height of the machine, means on said frame for collecting the material harvested by the machine including an elevator for lifting the material to the upper portion of said tank structure, means defining a loading conveying channel having opposite discharge ends opening into respective ones of said side tanks, said elevator having a discharge opening adjacent said channel and intermediate its ends so that material fed from said elevator is deposited in said channel, an auger journaled in said channel having oppositely directed flights wound on a common axis, a plate interposed between said auger flights on said common axis and adapted to block passage of material along said channel, said plate being positioned adjacent said discharge opening, and means on said frame for adjustably shifting said auger and said plate along their common axis relative to said discharge opening, whereby said plate proportions material fed from said elevator between said flights for selective discharge into either of said side tanks.

5. In an agricultural harvesting machine, the combination comprising, a body frame, a pair of saddle tanks straddling said frame and adapted to receive harvested material, means defining a conveying channel having opposite discharge ends communicating with respective ones of said saddle tanks, a conveyor having a discharge opening adjacent said channel and intermediate said ends so that material fed from said conveyor is deposited in said channel, an auger journaled in said channel having oppositely directed flights wound on a common axis and meeting at a point opposite said discharge opening, and means on said body frame for shifting said auger and said opening relative to one another so as to distribute material fed from said conveyor between said flights, so that material can be selectively discharged into said saddle tanks from either of said discharge ends.

6. In a machine handling agricultural products, the combination comprising, means defining a conveying channel having opposite discharge ends, a conveyor having a discharge opening adjacent said channel and intermediate said ends so that material fed from said conveyor is deposited in said channel, an auger journaled in said channel having oppositely directed flights wound on a common axis, said flights being separated by a plate that blocks passage of material along said channel and which is positioned adjacent said discharge opening, and means coupled to said auger for adjustably shifting said auger along its axis so that said plate proportions material fed from said conveyor between said flights, so that material can be selectively discharged from either of said discharge ends.

7. In a machine handling agricultural products, the combination comprising, an auger tube defining a conveying channel having opposite discharge ends, an elevator having a discharge point adjacent an opening in said tube intermediate its ends so that material fed from said elevator is deposited in said channel, an auger journaled in said tube having oppositely directed flights wound on a shaft, said flights being separated by a generally circular plate fitting in said tube so as to block passage of material along said channel, said plate being positioned adjacent said opening, and means coupled to said auger for adjustably shifting said auger shaft in an axial direction so that said plate proportions material fed from said elevator between said flights, so that material can be selectively discharged from either of said discharge ends.

8. In a machine for handling agricultural products such as harvested grain, the combination comprising, a power driven conveyor having adjacent alined portions for moving material in opposite directions, a pair of spaced receptacles for receiving material from said conveyor portions, means defining a material discharge passage disposed approximately over said conveyor at the point where said conveyor portions adjoin, means for discharging material through said passage so that material will be deposited on each of said conveyor portions, and means for selectively shifting said conveyor so as to move the point where said conveyor portions adjoin toward one side of said passage or the other so as to vary the proportion of material fed by said discharging means to respective ones of said conveyor portions and receptacles.

9. In an agricultural harvesting machine, the combination comprising a body frame for containing crop processing mechanisms, a saddle tank structure for receiving harvested material, said structure including a pair of side tanks disposed on opposite sides of said frame, means on said frame for collecting the material from said mechanisms including an elevator for lifting the material from the lower portion of said frame to the upper portion of said tank structure, and means on said frame for distributing the material lifted by said elevator into said side tanks.

10. In an agricultural harvesting machine, the combination comprising, a body frame for containing crop processing mechanisms, a saddle tank structure for receiving harvested material, said structure including a pair of side tanks disposed on opposite sides of said frame, means defining a separate outlet at the bottom of each said side tank, a discharge elevator having an inlet at the outlet of one of said side tanks, and a conveyor passing through said frame and closed to said mechanisms for delivering material from the outlet of the other side tank to the said one side tank.

11. In an agricultural harvesting machine, the combination comprising, a body frame, a saddle tank structure for receiving harvested material, said structure including a pair of saddle tanks disposed on opposite sides of said frame, each said tank having an upper central portion joined to the corresponding portion of the other tank, means disposed to divert material from the central portions to the side portions when said saddle tanks are being emptied, means defining a separate outlet at the bottom of each said saddle tank, a discharge elevator having an inlet at the outlet of one of said saddle tanks, and a conveyor for delivering material from the outlet of said other saddle tank to the said one saddle tank.

12. In an agricultural harvesting machine, the combination of a body frame for containing crop processing mechanisms, a saddle tank structure for receiving harvested material, said structure including a pair of side tanks disposed on opposite sides of said frame, means on said frame for collecting the harvested material from said mechanisms, means for elevating and delivering grain from said means for collecting to a level above the tanks, means for diverting delivered material downwardly and outwardly into each said side tank, and means for unloading one said side tank through the other side tank.

13. In an agricultural harvesting machine, the combination comprising, a body frame, a pair of saddle tanks disposed on opposite sides of said frame for receiving harvested material, and a center tank section joining said saddle tanks and overlying said frame, the bottom walls of said center tank section being formed as an inverted V in lateral section and the bottom walls of the saddle tanks extending below said center tank section and converging downwardly to a pair of separated outlet zones.

14. In a combine having two spaced grain receiving and storing tanks, the combination comprising, a distributing conveyor extending over each of said tanks, said distributing conveyor having a pair of grain discharge openings one disposed over each of said tanks, means for adjusting the rate of flow through said openings so as to control the quantities of grain fed to said tanks, a transfer conveyor interconnecting said tanks at their bottoms, and a discharge conveyor at one end of said transfer conveyor, said transfer conveyor having a first portion for feeding grain from one tank to the other tank and a second portion of greater capacity than the first for feeding grain through said other tank to said discharge conveyor so as to concurrently discharge grain from each of said tanks.

15. In a combine have two spaced grain storing tanks, a transfer conveyor for unloading said tanks comprising, in combination, means defining a passage interconnecting said tanks at their bottoms, an auger shaft journaled in said passage and extending into each of said tanks, a first auger flight wound on said shaft within one of said tanks and extending through said passage to the other of said tanks, a second auger flight of greater capacity than said first flight wound on said shaft from said passage through the other of said tanks, a discharge conveyor positioned at one end of said second auger flight for receiving grain from said tanks, and means for rotating said shaft so as to concurrently unload said tanks.

16. In a combine having two spaced grain storing tanks, a transfer conveyor for unloading said tanks comprising, in combination, means defining a tubular passage interconnecting said tanks at their bottoms, an auger shaft journaled in said passage and extending into each of said tanks, a first auger flight wound on said shaft within one of said tanks and extending through said passage to the other of said tanks, a second auger flight having a diameter greater than the diameter of said first flight wound on said shaft from said passage through the other of said tanks, a discharge conveyor positioned at one end of said second auger flight for receiving grain from said tanks, and means for rotating said shaft so as to concurrently unload said tanks.

References Cited in the file of this patent
UNITED STATES PATENTS

| | | |
|---|---|---|
| 2,016,954 | Mitchell | Oct. 1, 1935 |
| 2,364,353 | Escher | Dec. 5, 1944 |
| 2,569,039 | Berthelot | Sept. 25, 1951 |
| 2,614,707 | Bilterman | Oct. 21, 1952 |
| 2,627,356 | Bell | Feb. 3, 1953 |
| 2,633,255 | Hoffstetter | Mar. 31, 1953 |
| 2,636,331 | Price | Apr. 28, 1953 |
| 2,642,980 | Soucek | June 23, 1953 |
| 2,717,703 | Kull et al. | Sept. 13, 1955 |
| 2,813,704 | Mackissic | Nov. 19, 1957 |
| 2,863,575 | Vasold | Dec. 9, 1958 |
| 2,925,184 | Powischill et al. | Feb. 16, 1960 |